US007665215B2

(12) United States Patent
Fogle

(10) Patent No.: US 7,665,215 B2
(45) Date of Patent: Feb. 23, 2010

(54) FIXED LINE TRIMMER HEAD WITH EASE OF LOADING

(75) Inventor: John R. Fogle, Carefree, AZ (US)

(73) Assignee: Desert Extrusion Corporation, Phoenix, AZ (US)

( * ) Notice: Subject to any disclaimer, the term of this patent is extended or adjusted under 35 U.S.C. 154(b) by 242 days.

(21) Appl. No.: 11/890,157

(22) Filed: Aug. 2, 2007

(65) Prior Publication Data

US 2009/0031567 A1 Feb. 5, 2009

(51) Int. Cl.
*A01D 34/67* (2006.01)
*A01D 34/84* (2006.01)

(52) U.S. Cl. ............................... 30/276; 30/347; 56/294

(58) Field of Classification Search .................. 30/276, 30/347, DIG. 5; 56/12.5, 12.7, 255, 294, 56/295; 172/13
See application file for complete search history.

(56) References Cited

U.S. PATENT DOCUMENTS

| 4,756,146 A | * | 7/1988 | Rouse | ........................ 56/12.7 |
|---|---|---|---|---|
| 5,023,998 A | | 6/1991 | Masciarella | |
| 5,615,543 A | | 4/1997 | Caffey | |
| 5,979,064 A | * | 11/1999 | Kitz et al. | ........................ 30/347 |
| 6,035,618 A | * | 3/2000 | Fogle | .......................... 56/12.7 |
| 6,363,616 B1 | * | 4/2002 | Kreissle | ......................... 30/347 |
| 6,457,242 B1 | * | 10/2002 | Fogle | ........................... 30/347 |
| 7,000,324 B2 | * | 2/2006 | Fogle | ........................... 30/276 |

* cited by examiner

*Primary Examiner*—Boyer D. Ashley
*Assistant Examiner*—Edward Landrum
(74) *Attorney, Agent, or Firm*—Etherton Law Group, LLC; Sandra L. Etherton; Benjamin D. Tietgen

(57) ABSTRACT

A head for string trimmer machines uses fixed length segments of line including at least two line segments. The head includes a generally cylindrically shaped main housing member with at least two sets of first and second line entry holes on the housing member intermediate the first and second ends. At least two sets of first and second line exit openings also are found on the main housing member intermediate the first and second ends and spaced apart a greater distance than the distance between the first and second line entry holes. Arcuate guide channels are located between the respective entry holes and exit openings where the corresponding entry openings and exit openings of corresponding sets are located at different distances measured axially on the main housing member from the first end thereof.

6 Claims, 5 Drawing Sheets

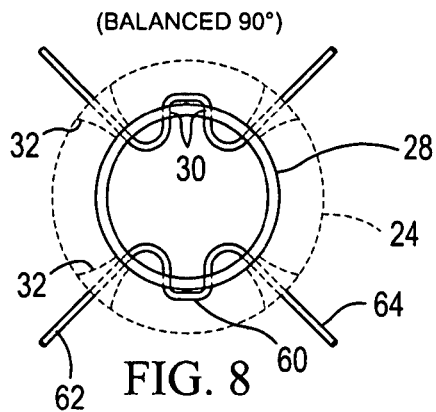
FIG. 8 (BALANCED 90°)
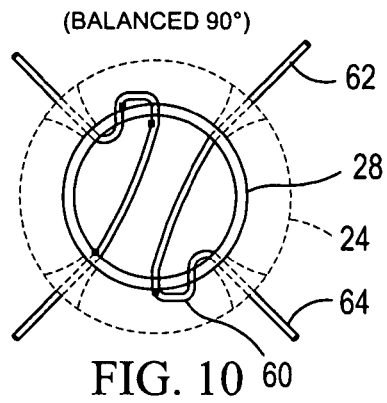
FIG. 10 (BALANCED 90°)
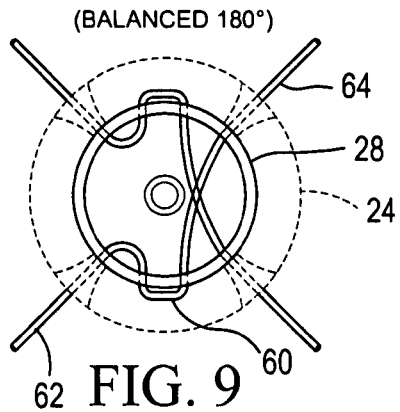
FIG. 9 (BALANCED 180°)
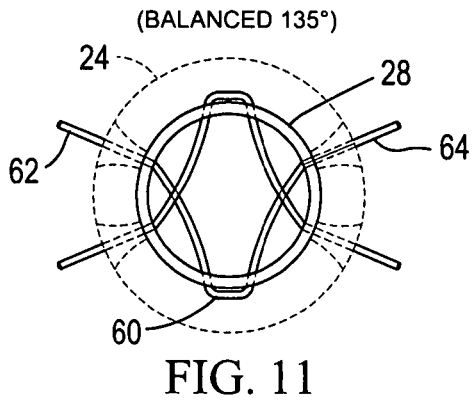
FIG. 11 (BALANCED 135°)
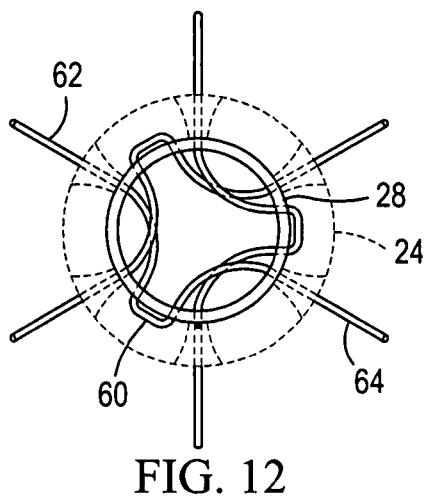
FIG. 12
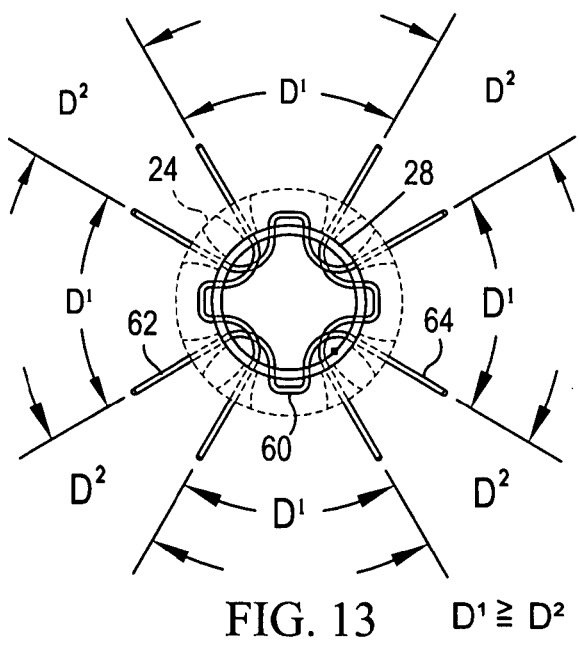
FIG. 13    $D^1 \geqq D^2$

FIXED LINE TRIMMER HEAD WITH EASE OF LOADING

BACKGROUND

Weed and grass trimmers have been developed which employ a rotatable hub with a short length of flexible nylon or other plastic line extending from the hub. When the hub is rotated (typically, at speeds from 6,000 RPM to 12,000 RPM), the tip of the line extending from the hub provides the cutting or trimmer action. Grass and weed trimmers using this principle of operation have become popular for their versatility of use and because the flexible trim line is safer to use that rigid rotating steel blades.

Various types of devices have been developed using such trim lines. Typically, rotating line trimmers or rotating string trimmers employ a trimmer line which generally has a circular cross section. The line, in many trimmers, is wound on a storage reel in the hub of the device, and is fed out of a hole or a plurality of holes in the hub in discrete amounts, as the end breaks off or wears off. Trimmers of this type sometimes are referred to as "bump and feed" trimmers. If the line breaks off, the bottom of the storage reel is bumped while the hub continues rotating to cause a spring release of the line within the trimmer. A short length of line then plays out through a hole in the hub by means of centrifugal force. Typically, the smaller (2½" diameter to 3½" diameter) head bump and feed string trimmers use relatively small diameter line, normally in the range of 0.65" to 0.080" diameter, since the smaller diameter flexible line functions better for the centrifugal feeding of such smaller diameter bump and feed heads.

A problem exists with all bump and feed trimmers, however, in that frequently the line which is wound on the storage reel in the hub tends to become stuck, either due to partial fusion of the line in the hub caused by high frequency vibration, or by successive turns of the line wound on the hub becoming somewhat entangled. As a result, feeding of the line from the hub when desired does not always take place. When this occurs, it is necessary to remove the hub from the string trimmer device and manually extract the desired length of line prior to re-attaching the hub of the device. This is a time consuming and frustrating experience for many users of flexible line string trimmers. It is particularly frustrating for commercial landscapers because of the amount of lost time required to remove the hub, extract the line, and then re-attach the hub before operation can resume.

Efforts to overcome the inherent disadvantages of bump and feed trimmers have included the development of heads designed to accept fixed lengths of line, which are inserted into the head and held in place by various techniques. Once such device is disclosed in the patent to U.S. Pat. No. 5,615,543 Caffey. This patent employs a cut length of line having an enlarged portion or flange at one end. A small entry hole is located in the periphery of the head adjacent a larger exit hole. The line is inserted from outside the periphery of the head into the insert hole, where the enlarged end or flange on the line meets an abutment and is held in place. The line then is grasped from the hollow interior of the head and pushed through the exit hole and pulled tight. The bottom of the head is open to allow this access to both the interior and exterior of the head. A disadvantage of this device is the requirement for the operator to insert the line from outside the periphery of the head, then turn the head over, and reinsert the line back through the exit hole each time a line is to be inserted into the machine. Removal of a line is the reverse of the order mentioned. It is necessary to have access to the head both from the exterior periphery and from the bottom in order to accomplish insertion and removal of line segments. Multiple line segments (two are shown in the patent) may be inserted on opposite sides of the head.

The U.S. Pat. No. 5,023,998 to Masciarella is another attempt at the design of a string trimmer cutting machine utilizing fixed lengths of line. In the Masciarella patent, line segments are inserted into the machine from the open bottom by manipulating the line around guide wedges in a generally serpentine path on opposite sides of the head. Two line segments, each extending diametrically across the head and crossing at 90° angles, may be used to allow the head to have four lengths or ends of line extending from it. When a new length of line needs to be inserted, the old line must be removed; and this requires manipulating the line past the wedges once again in order to permit the line to be taken out of the machine. A new line then must be guided into place around the wedges or guide surfaces. Because the guide surfaces are close together, it becomes difficult to install, and particularly to remove, sections of nylon line from a trimmer head having the design shown in the '998 patent. This difficulty results in excessive time being consumed for the removal and replacement of line segments.

The U.S. Pat. No. 6,035,618 to Fogle also is directed to a fixed line trimmer head using a single length of line extending from diametrically opposite sides of the trimmer head. The trimmer head of the Fogle '618 patent overcomes the disadvantages of the devices discussed above. The trimmer head of Fogle employs a pattern of pairs of entry and exit holes for inserting a fixed length of trimmer line through a pair of relatively closely spaced entry holes, and then extending each end of the line out through exit holes located in the head. The entry holes and exit holes are offset from one another in different planes perpendicular to the axis of the trimmer head, and securely hold the line in place during use of the trimmer. It is relatively easy to remove an expended section of line and replace it with a new section of line when necessary. The fixed line trimmer head of the Fogle '618 patent, however, does require the user to manually insert the opposite ends of the line through the two entry holes, and then again manually to insert each of the ends of the line segment into the exit holes in the head whenever line replacement is required. This is indicated somewhat in FIG. 9 of the Fogle patent. Because of the necessity to manually insert the ends of a line segment through separate entry and exit holes for each length of the line, the user is required to have access through the bottom of the hollow trimmer head in order to extend the ends of the line into the exit holes for use.

The U.S. Pat. No. 6,457,242 to Fogle eliminates the necessity for access to the interior of the head through the bottom while employing a single fixed length of trimmer line. In the Fogle '242 patent, a pair of entry holes are located on the exterior surface of the head in a similar manner to the position for the entry holes disclosed in the Fogle '618 patent. In the Fogle '242 patent, however, the two ends of the line inserted into the adjacent entry holes are internally guided through arcuate guide channels formed in an insert in the interior of the head to exit out of the line exit holes. Once the line has exited from the diametrically opposed exit holes, it is pulled tightly and the offset position axially of the entry holes with the exit holes, combined with the arcuate guide paths, firmly holds the line in place during use. Removal of the line is readily effected by grasping it from outside the housing at the loop between the two entry holes and pulling it out in the reverse direction from insertion. Consequently, removal and replacement of a line is greatly facilitated through the use of the Fogle '242 head. The Fogle '242 patent also discloses the use of two different sizes of entry holes located on opposite sides of the head to accommodate lines of smaller diameters on one side and lines of larger diameters on the other side. If a change from lines of one diameter set to a different diameter set is required, the arcuate guide insert is rotated 180° to accommodate the entry holes on the opposite side of the head. This requires removal and replacement of the insert carrying the guide channels whenever a change from one range of line sizes to a different range of sizes is desired.

It is desirable to provide a fixed length line trimmer head with greater versatility and ease of operation which overcomes the disadvantages of the prior art devices.

BRIEF DESCRIPTION OF THE DRAWINGS

FIGS. 8 through 13 illustrate various arrangements of line configurations for the embodiments disclosed in FIGS. 1 through 7.

DETAILED DESCRIPTION

Figure 1:
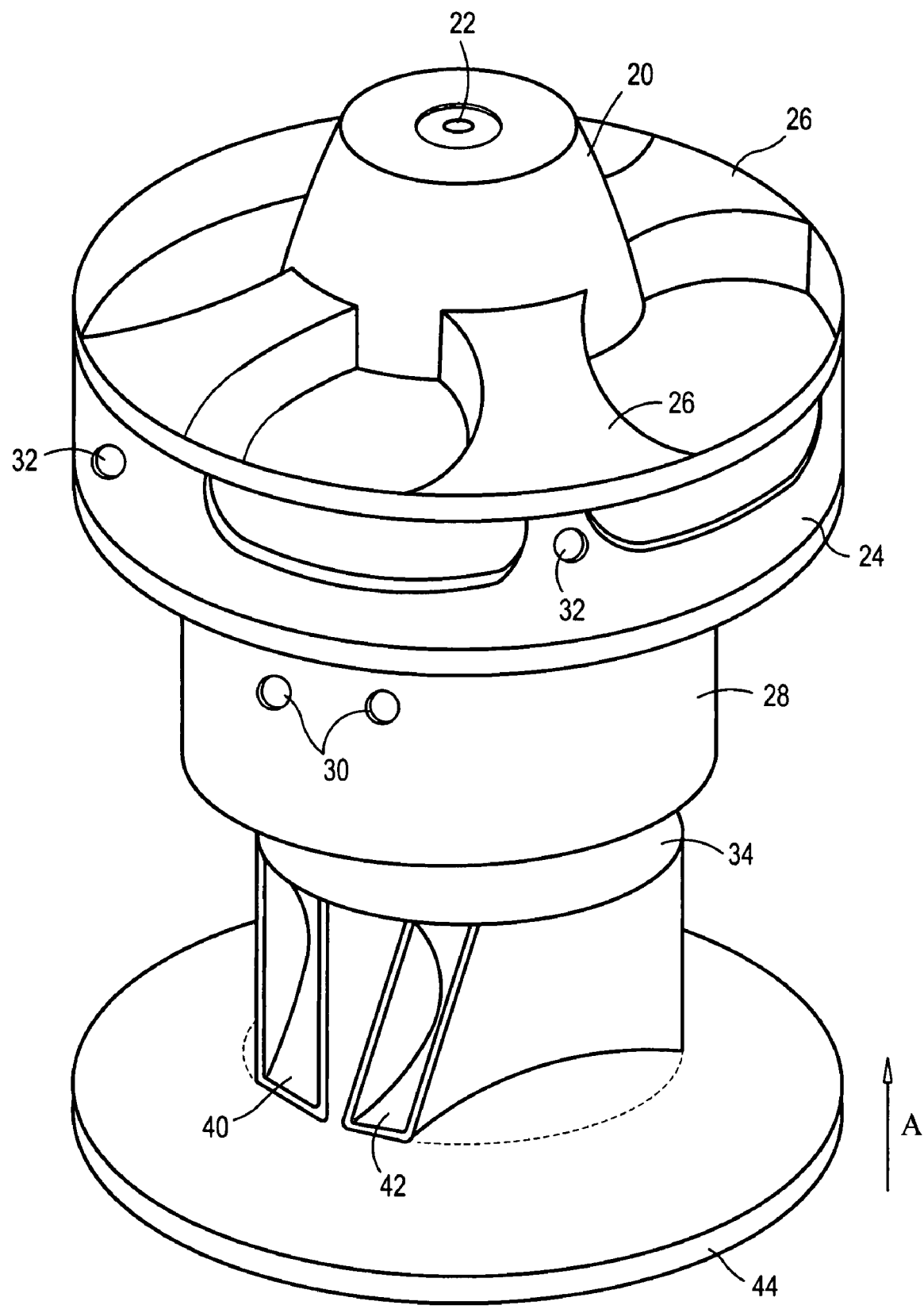
FIG. 1 is a top perspective exploded view of an embodiment of the invention.

Reference now should be made to the drawings, in which the same reference numbers are used throughout the different figures to designate the same or similar components. FIG. 1 is a top exploded perspective view of an embodiment of the invention designed to be attached to the end of the operating shaft of a string trimmer machine. As disclosed in FIG. 1, the trimmer head for using fixed length segments of trimmer line comprises a generally central cylindrically shaped hollow main housing 20 (preferably made of aluminum), with a circular flange 24 near the upper end thereof and a smaller, hollow, cylindrical, downwardly depending portion 28 located beneath the flange 24. A circular opening 22 is provided in the top of the upper part of the housing for attachment in any suitable standard manner to the end of the operating shaft of a string trimmer machine. The lower cylindrical portion 28 of the upper part of the housing is open at its lower end, as is readily apparent from the cross-sectional view of FIG. 2.

The upper, somewhat tapered portion of the housing 20 has a four outwardly extending flanges or spokes 26 extending at 90° intervals from it, and terminating in the circular flange 24, as is most clearly shown in FIG. 1. The lower cylindrical portion 28 of the upper housing part has two diametrically opposed pairs or sets of string trimmer line entry holes 30 formed through the portion 28. Each of these sets or pairs of holes 30 are drilled through or formed through the portion 28 in a direction extending radially from the central axis of the various parts of the main housing 20,22,24,28. The sets of holes 30 also could be drilled or formed parallel to one another, although a radial orientation is considered practical.

Line exit openings 32 are located in the embodiment of FIGS. 1 through 4 at 90° intervals through the flange 24 of the upper housing part. Typically, the line exit openings 32 are of a slightly larger diameter than the line entry holes 30, although this is not necessary. The spacing between the line entry holes 30 is a relatively short distance compared to the spacing between the line exit openings 32 in the flange 24, and is designed to accommodate a bight in a segment of string trimmer line such as the bight 60.

For a typical embodiment of the head shown in FIGS. 1 through 7, the outside diameter of the portion 28 is approximately 2⅛"; and the wall thickness of the portion 28 is approximately ¼". The outside diameter of the flange 24 typically is 4"; and the overall height of the housing from the top at the opening 22 to the open bottom of the cylindrical portion 28 is approximately 2". These dimensions are typical of a head designed for use with a large number of different string trimmer machines manufactured by a variety of manufacturers for the home use market. Clearly, the dimensions of the trimmer head shown in the drawings may be varied in accordance with particular machines designed for different uses, as desired.

Figure 2:
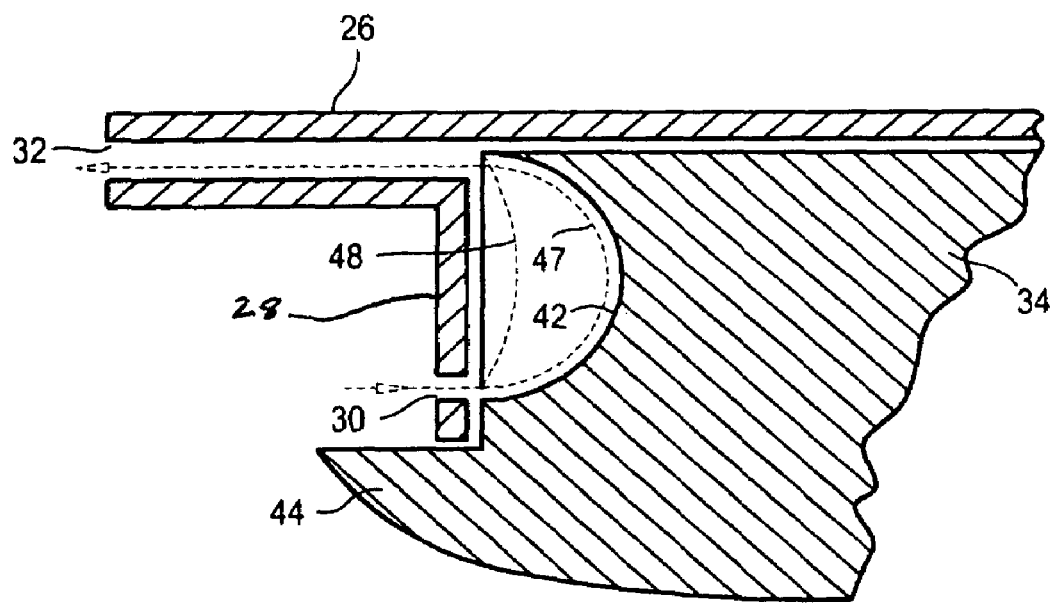
FIG. 2 is a diagrammatic representation of a feature of the embodiment of FIG. 1.

In order to facilitate the use of the trimmer line head described thusfar, a second mating part comprising the lower part of the assembly is inserted into the hollow bottom of the portion 28, as indicated by means of the directional arrow A in FIG. 1, ad as shown in the diagrammatic cross section of FIG. 2. This lower part of the housing has an outwardly extending skid plate 44 located on the bottom. Two sets, or two pairs, of upwardly extending arcuate guide channels 40 and 42 are located on diametrically opposite sides of the lower part of the head, and include outwardly diverging guide channels 40 and 42, respectively, in each of the two sets for providing a guide path from, for example, the guide path 40 from the left-hand insert hole 30 to the left-hand exit opening 32, and from the right-hand insert hole 30 through the guide path 42 to the right-hand exit opening 32 shown in FIG. 1. This occurs when the lower part or insert is inserted fully into the hollow lower cylindrical extension 28 of the upper part of the main housing member to the position shown in FIG. 2 where the top of the lower unit 34 is located adjacent the interior of the flange 24 to provide communication with the upper end of the arcuate guide channels 40 and 42 with the associated exit openings 32 at the top and with the insert holes 30 at the bottom, as illustrated most clearly in the diagrammatic representation in FIG. 2.

When the end of a line segment is inserted through the hole 30, it follows the dotted line path 47 along the interior arcuate guide channel 42 (and 40, not shown), as it is pushed through the hole 30, to exit through the line exit opening 32 in the flange 24. This is done with both ends of the line segment. For example, the line segment with the bight 60 between the two line insert holes 30 shown in FIG. 3 has the two ends 62 and 64 exiting from respective exit openings 32 of FIG. 3, which has the general orientation of the exploded view shown in FIG. 1. The dotted line configuration showing the bight 70 in a line segment having one end 72 and another end 74 (not shown) is located on the opposite side of the cylindrical portion 28, as indicated in dotted lines in FIG. 3.

Figure 3:
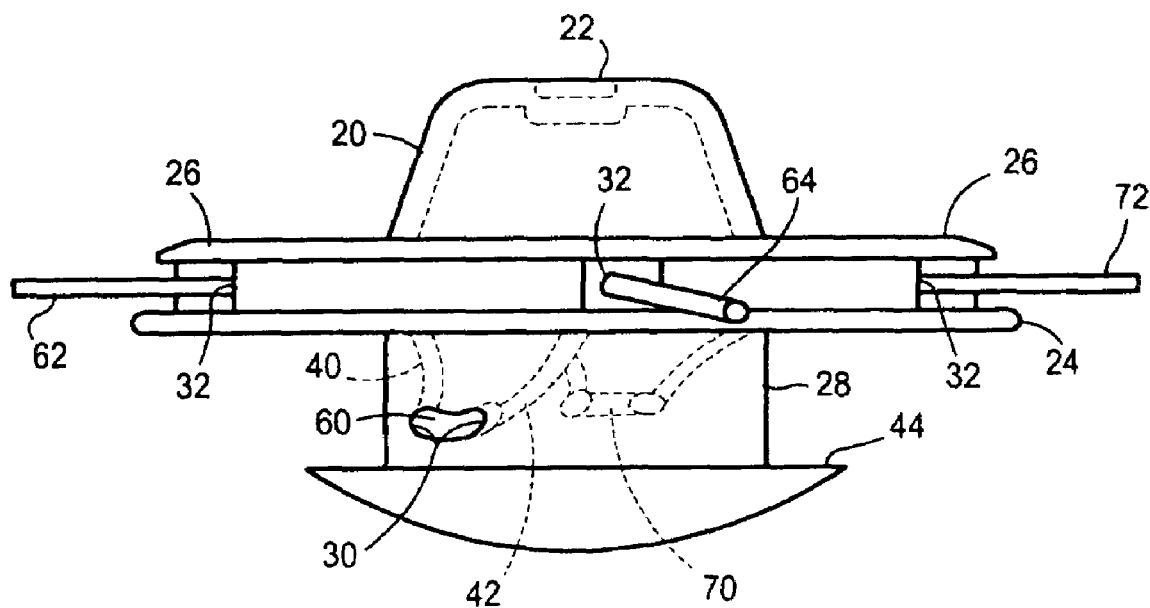
FIG. 3 is a side view of the assembled embodiment of FIG. 1.
Figure 4:
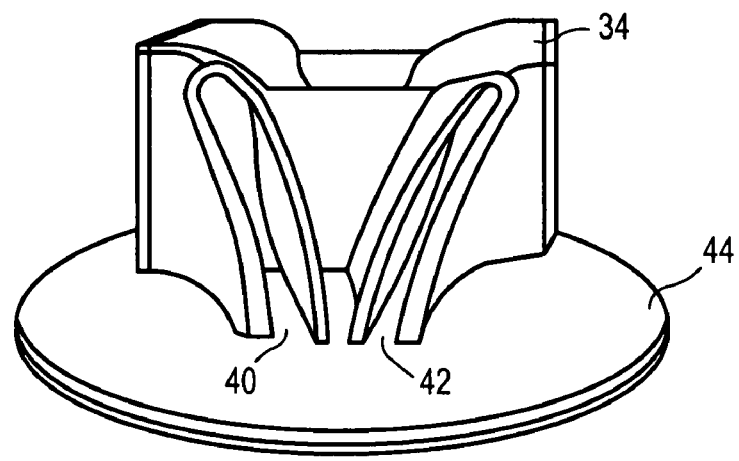
FIG. 4 is a top perspective view of a portion of the embodiment shown in FIG. 1.

FIG. 4 is a top perspective view of the lower portion 34/40/42/44 indicating the diverging nature of the arcuate guide paths 40 and 42 on one side of the lower insert portion of the housing. A similar pair of guide paths is located on the diametrically opposite side to allow the insertion of two fixed lengths of line segments, in the manner illustrated in FIG. 3, to cause four line segment ends 62/64/72 and 74 to exit from the housing at 90° intervals about the periphery of the flange 24, as diagrammatically indicated in FIG. 8.

The insert forming the lower mating part of the upper and lower mating parts can be of a generally machined or molded configuration, as shown in FIGS. 1 and 4; or it may be more in the order of a solid plug of material with the arcuate guide paths formed into or cut into it at the angles required to cause the line to follow the paths 40 and 42, for example, from the entry holes 30 to the corresponding exit openings 32. The line ends, such as 62 and 64, extending from the bight 60 in FIG. 3 then are pulled outwardly tightly to cause the internal configuration of the line to follow the path indicated by the reference number 48 in FIG. 2. By locating the entry holes 30 in a plane which is offset from the exit openings 32, additional frictional forces are employed which significantly inhibit the withdrawal of a line segment by an external pulling on either of the end portions, for example 62 or 64.

When the line is worn or broken and needs to be replaced, grasping the line at the bight 60 (or 70 as shown in FIG. 3), either by use of a pair of pliers or the fingers of the user, and pulling it outwardly, readily withdraws and removes the segment ends 62 and 64 and permits a rapid and relatively easy replacement of a new line segment into the head.

Figure 5:
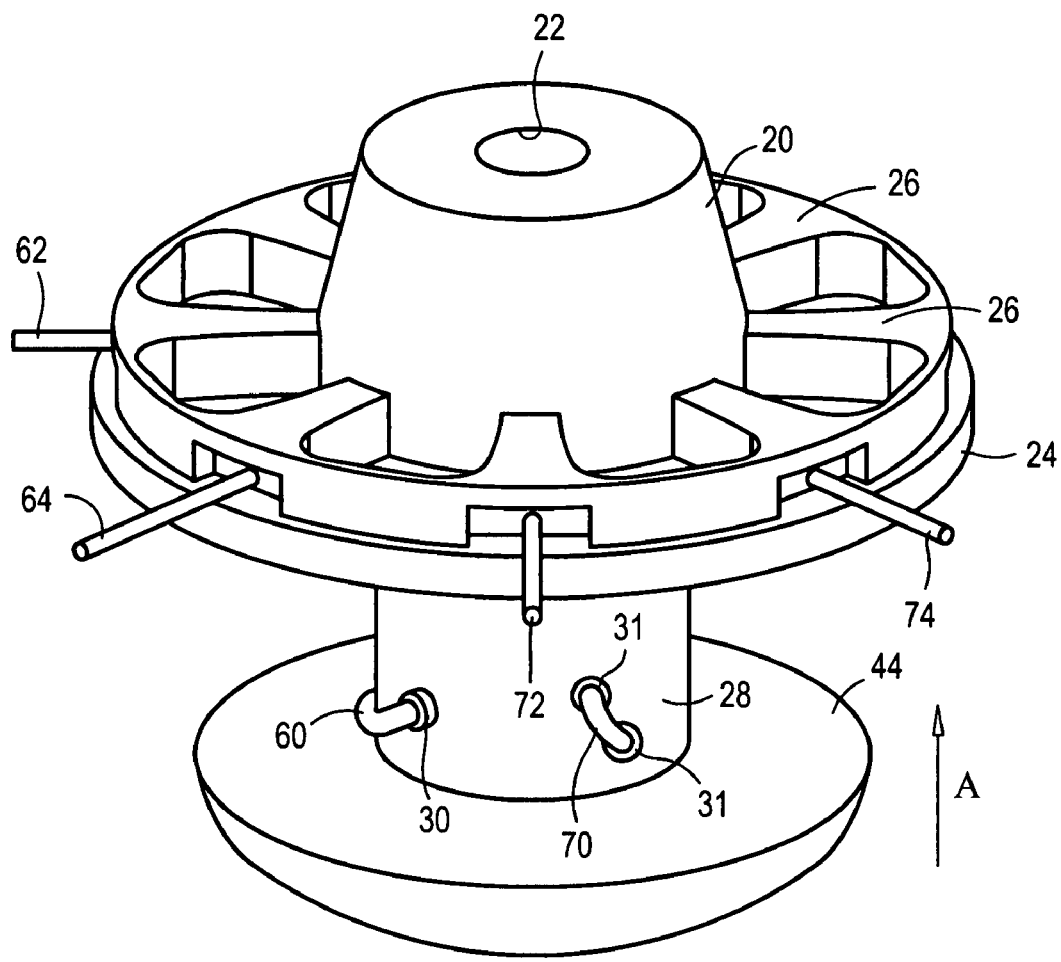
FIG. 5 is a top perspective view of a variation of the embodiment shown in FIG. 1.

It also should be noted that while the entry holes 30 and the exit openings 32 are illustrated in FIGS. 1 through 3 as being located in parallel planes both perpendicular to the central axis of the cylindrical parts, it is not necessary to orient the holes 30 in a plane parallel to the exit openings 32. For example, FIG. 5 shows a pair of entry holes 31 which are located substantially the same distance apart as the entry holes 30 of FIG. 1, but which are located at different distances axially from the top of the head at the location 22 where it is attached to the string trimmer machine. The arcuate paths in the insert used for a pair of such offset holes illustrated as having the bight 70 of trimmer line between them, is configured to guide the line from the respective hole, for example the upper hole 31 to the exit segment 72, and from the lower hole 31 to the exit hole for the segment 74, as illustrated in FIG. 5. It also should be noted in FIG. 5 that the head may be configured to allow eight line end extensions to extend outwardly therefrom at 45° intervals, as compared with the 90° intervals of the embodiment shown in FIGS. 1 through 4. The manner in which this is done is by re-configuring the guide paths in the lower insert or mating part of the head to direct the line to the respective or corresponding exit openings. To provide eight line end extensions from a head, four line segments are employed with corresponding pairs or sets of arcuate guide channels for each of the four sets of line entry holes being provided. Also, it should be noted that while the embodiments shown in FIGS. 1 through 5 thus far provide the line extensions at equi-angular intervals in a symmetrical, balanced configuration, the angular spacing between different ones of the line extensions need not be equi-angular about the periphery of the trimmer head.

Figure 6:
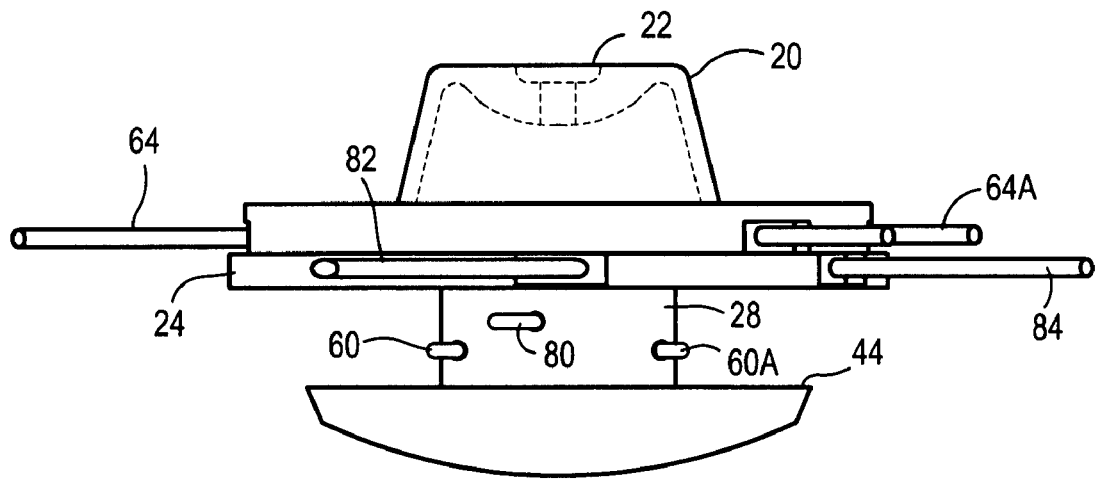
FIG. 6 is a side view of the embodiment shown in FIG. 5.

Also, the line entry holes for each set of entry holes need not be in the same plane about the periphery of the portion 28, but may be located in different planes, as indicated in FIG. 6, for an eight line end extension head of the general type shown in FIG. 5. In FIG. 6, the bights 60 and 60A of two different sets of line segments are shown as extending into entry holes 60 located in the same plane as discussed previously in conjunction with FIGS. 1 and 3.

A different set of entry holes in a different plane, intermediate the plane of the holes for the line 60 and the exit openings is shown for the bight of line 80, from which the extensions or ends 82 and 84 pass through corresponding exit openings. Also, it should be noted in FIG. 6 that not all of the exit openings for the line ends need to be located in the same plane; although typically, the exit openings are located in the same plane in order to provide uniform cutting operation from the different line ends. If for some reason, however, cutting from two different elevations simultaneously by line end extensions in different planes is desired, FIG. 6 illustrates the manner in which this can be accomplished.

Figure 7:
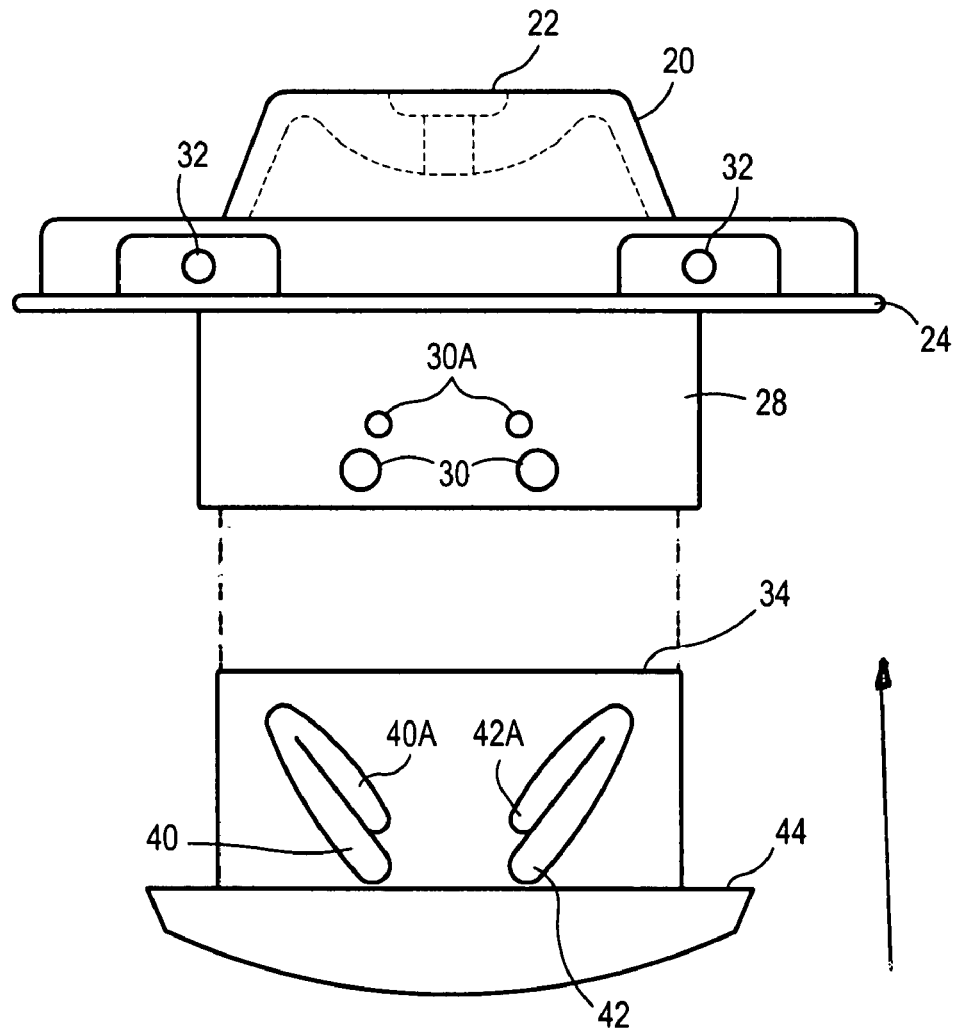
FIG. 7 is a partially exploded side view of an alternative for the embodiment shown in FIG. 1.

FIG. 7 is a partially exploded diagrammatic view of a variation of the embodiments which have been described thus far. FIG. 7 is designed to accommodate line segments in two different ranges of sizes, namely a relatively small size diameter range and a second, relatively larger size diameter range. The exit openings 32 which are formed in the flange 24 may be designed to accommodate the largest diameter line which is used with the head. The entry holes, however, need to be relatively closer in diameter to the external diameter of the line segments with which they are used; so that smallest diameter line does not slip out of relatively large entry holes.

In the embodiment shown in FIG. 7, two sets of entry holes 30 and 30A are shown as located adjacent one another on the cylindrical portion 28 in generally the same manner as the entry holes 30 of the embodiment shown in FIG. 1. The holes 30, however, are shown in FIG. 7 as being of a relatively large diameter, with smaller diameter holes 30A located in a plane slightly above the plane in which the holes 30 are located. The insert or lower portion of the telescoping housing then has the arcuate guide paths 40 and 42 formed in it in the same manner as described previously in conjunction with the embodiment of FIGS. 1 through 4. In addition, however, a smaller or narrower guide path 40A and 42A for each of the holes 30A is provided. The lower ends of both of the guide paths 40 and 40A are located adjacent the left-hand holes 30 and 30A, respectively, of the hole sets shown in FIG. 7. Similarly, the lower end of the guide path 42 is located adjacent the right-hand hole 30; and the lower end of the smaller guide path 42A is located adjacent the smaller diameter right-hand hole 30A in the housing 28.

The upper or exit ends of the guide paths 40 and 40A converge to exit at the same exit opening 32 (the left-hand one shown in FIG. 7). The upper or exit ends of the paths 42 and 42A converge and combine to exit at the opening of the corresponding exit opening 32 (the right-hand one) shown in FIG. 7. Consequently, whether a relatively large diameter line is inserted through the holes 30, or a relatively smaller diameter line is inserted through the holes 30A, the converging arcuate guide paths formed in the plug or lower housing part 34 automatically cause the line ends to exit properly out of the corresponding exit openings 32.

It should be noted that while the configuration shown in FIG. 7 uses the 90° line end spacing described above in conjunction with FIGS. 1 through 4, corresponding sets of entry holes for greater numbers of line exit segments could be employed utilizing the same principles described in conjunction with the 90° exit opening spacing illustrated in FIG. 7.

The guide channels which have been described in conjunction with the embodiments shown in FIGS. 1 through 7 can be varied in order to accommodate a variety of different line paths through the head, as indicated in FIGS. 8 through 13. These figures all diagrammatically illustrate line segment paths which may be taken in conjunction with different line guide channels in the second or lower mating part of the telescoping head assembly. FIG. 8 has been discussed previously in conjunction with the embodiment of FIGS. 1 through 4. Using the same opposing pairs of entry holes 30, which are illustrated in FIGS. 1 through 4, however, the line exit configurations (and therefore, the internal line guide paths) can take any of the path configurations shown in FIGS. 8, 9, 10 and 11.

FIGS. 12 and 13 show possible configurations for using three line segments and four line segment sets, respectively, to provide six line end extensions (FIG. 12) or eight line end extensions (FIG. 13) if such a configuration were desired. It should be noted that for each line segment inserted into a pair of entry holes, two line ends exit from different exit openings located on the periphery of the flange 24 of the upper portion of the housing.

The lower or second housing part 34 to 44 may be removably or permanently located in place in the upper housing during initial assembly. The manner in which the arcuate guide channels 40 and 42, or 40A and 42A are formed may be by molding them in a particular configuration as shown in FIG. 4, or by machining them to the desired curvature with them tapering as generally indicated in FIG. 7 from a solid block of material. The manner in which the arcuate guide channels is formed is not important, so long as the orientation of the channels permits the operation which has been described in detail above for relatively easy insertion and removal of line segments from the exterior of the housing from its side. The user is not required to turn the head over and manipulate line segments from within or underneath the head. The manner in which the two telescoping parts of the head are interconnected and held together is not important; and any suitable techniques for accomplishing this purpose may be employed.

The exit openings 32 also typically may be flared; so that the line segments extending outwardly through these openings are allowed to flex without bending the line at a sharp angle during operation of the string trimmer machine with which the trimmer head is used. The main housing also could be made of high-impact plastic material with metal sleeves in all of the entry holes and exit openings to prevent fusion of the vibrating line from taking place between the line and the entry holes and exit openings.

The foregoing description of various embodiments of the invention is to be considered illustrative and not as limiting. Various other changes and modifications will occur to those skilled in the art for performing substantially the same function, in substantially the same way, to achieve substantially the same result without departing from the true scope of the invention as defined in the appended claims.

What is claimed is:

1. A trimmer head for string trimmer machines using fixed length segments of line including in combination: a generally cylindrically shaped main housing member having first and second ends with a central axis, and configured at the first end thereof for attachment to a drive shaft of a string trimmer machine; at least a first set of first and second line entry holes and a second set of first and second line entry holes on the main housing member intermediate the first and second ends thereof, with the first and second sets of first and second line entry holes spaced at different distances from the first end of the main housing member, with the first set located closer to the first end of the main housing member than the second set, and with the spacing between the first and second line entry holes of the first set in a first predetermined distance and the spacing between the first and second line entry holes of the second set being a second predetermined distance; at least a first set of first and second line exit openings on the main housing member intermediate the first and second ends thereof and spaced apart a third predetermined distance greater than both the first and second predetermined distances; a first arcuate guide channel between the first line entry hole of the first set of line entry holes and the first line exit opening of the first set of line exit openings; a second arcuate guide channel between the first line entry hole of the second set of line entry holes and the first line exit opening of the first set of line exit openings with the first and second arcuate guide channels converging at the first line exit opening of the first set of line exit openings; a third arcuate guide channel between the second line entry hole of the first set of line entry holes and the second line exit opening of the first set of line exit openings; a fourth arcuate guide channel between the second line entry hole of the second set of line entry holes and the second line exit opening of the first set of line exit openings with the third and fourth arcuate guide channels converging at the second line exit opening of the first set of line exit openings.

2. A fixed line trimmer head according to claim 1 wherein the first and second line entry holes of the first set of line entry holes each have a first diameter and the first and second line entry holes of the second set of line entry holes each have a second diameter different from the first diameter.

3. A fixed line trimmer head according to claim 2 wherein the first diameter is greater than the second diameter, and the first set of line entry holes is located a greater distance from the first end of the housing than the second set of line entry holes.

4. A fixed line trimmer head according to claim 3 wherein the main housing member includes first and second mating parts assembled in a telescoping relationship, with the arcuate guide channels formed by configurations in at least one of the telescoping parts.

5. A fixed line trimmer head according to claim 4 wherein the first and second line entry holes of the sets of line entry holes are circular.

6. A fixed line trimmer head according to claim 1 wherein the main housing member includes a circular flange extending outwardly therefrom in a plane perpendicular to the axis thereof, and wherein the first and second line exit openings of the first set of line exit openings are located on the periphery of the circular flange.

\* \* \* \* \*